(12) United States Patent
Orimoto et al.

(10) Patent No.: US 6,409,189 B1
(45) Date of Patent: *Jun. 25, 2002

(54) SUSPENSION ARM MOUNTING STRUCTURE

(75) Inventors: Yukihiro Orimoto; Ryoji Nakagawa; Tuyoshi Funano, all of Saitama (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,147

(22) Filed: Aug. 19, 1999

(30) Foreign Application Priority Data

Aug. 21, 1998 (JP) .......................... 10-235446

(51) Int. Cl.⁷ ............................................ B62D 17/00
(52) U.S. Cl. ........................ 280/86.751; 280/86.754; 411/539
(58) Field of Search .................. 280/86.754, 86.75, 280/86.751, 86.753, 86.755; 403/4; 411/398, 539, 383, 338

(56) References Cited

U.S. PATENT DOCUMENTS

| | | | | |
|---|---|---|---|---|
| 3,880,444 A | * | 4/1975 | Bridges | 280/86.753 |
| 4,424,984 A | * | 1/1984 | Shiratori et al. | 280/86.753 |
| 5,163,699 A | * | 11/1992 | Specktor | 280/86.753 |
| 5,398,411 A | * | 3/1995 | Kusaka et al. | 29/897.2 |
| 5,779,260 A | * | 7/1998 | Reilly et al. | 280/86.754 |
| 5,826,894 A | * | 10/1998 | McDonald et al. | 280/86.756 |

FOREIGN PATENT DOCUMENTS

JP 2627940 4/1997 ........... B60G/7/02

* cited by examiner

Primary Examiner—J. J. Swann
Assistant Examiner—David R. Dunn
(74) Attorney, Agent, or Firm—Sughrue Mion, PLLC

(57) ABSTRACT

There is provided a suspension arm mounting structure in which a mounting end portion 2 of a suspension arm 1 is fastened relative to a vehicle body 4 with a bolt 11 and a nut 12 and in which the wheel alignment is adapted to be adjusted by displacing the bolt in a direction orthogonal to an axis thereof through rotation of a pair of plate cams 15, 19 disposed at ends of the bolt, characterized in that a cylindrical collar 13 is provided over a shank portion 11b of the bolt; in that one 15 of the pair of plate cams and an engagement portion 16 for engagement with a turning tool are provided at one end of the cylindrical collar in such a manner as to prohibit a relative rotation therebetween, and in that an engagement portion 17 is formed on the other end of the cylindrical collar so as to prohibit a relative rotation between the cylindrical collar and the other 19 of the pair of plate cams. According to this construction, since the bolt and the plate cam can rotate relatively to each other, tightening can be effected at the head of the bolt. In addition, both adjusting the wheel alignment and tightening the bolt can be performed on the same side by disposing the engagement portion for engagement with a turning tool for use in performing a wheel alignment adjustment on the side of the head of the bolt.

4 Claims, 3 Drawing Sheets

SUSPENSION ARM MOUNTING STRUCTURE

BACKGROUND OF THE INVENTION

1. Field of the Invention

The present invention relates to a suspension arm mounting structure in which the wheel alignment can be adjusted by displacing a bolt for fastening a suspension arm to a vehicle body in a required direction through rotation of plate cams.

2. Description of the Related Art

Conventionally known is a suspension arm mounting structure in which a plate cam composed of an eccentric disc is connected to a bolt for fastening a connecting portion of a suspension arm to a vehicle body in such a manner as to prohibit a relative rotation therebetween, whereby the bolt can be displaced in a direction orthogonal to an axis thereof when the bolt is operated to rotate for adjustment of the wheel alignment (refer to the official gazette of Japanese Patent Publication No. 2627940 or the like).

FIG. 3 shows a conventional suspension arm mounting structure as described above. In this structure, a pair of mounting bushes 2, 3 of a suspension arm 1 are adapted to be fastened to brackets 4, 5 on a vehicle body side, respectively, with a bolt 31 and a nut 32. A plate cam 33 is provided integrally with a head of the bolt 33, and a plate cam 34 having an external cam profile identical to that of the cam 33 is fitted on a shank of the bolt 31 at a position where apexes of the cam profiles of both the plate cams are aligned with each other in such a manner as to prohibit a relative rotation between the bolt 31 and the plate cam 34.

A pair of guides 6 is fixedly provided on each side of the respective brackets 4, 5 in such a manner as to face each other with an elongated hole 7 therebetween so that the pair of guides 6 regulate the outer circumference of each of the plate cams 33, 34 when they are assembled in place. The bolt 31 can be displaced in a longitudinal direction of the elongated hole 7, that is, a direction orthogonal to an axis of the bolt 31 when both the plate cams 33, 34 are rotated in an interlocking fashion by turning the head of the bolt 31 with a turning tool such as a wrench.

However, in the above construction in which the pair of plate cams 33, 34 is connected to the bolt 31 in such a manner as to prohibit a relative rotation between the plate cams and the bolt, after a wheel alignment adjustment is completed by turning the bolt 31, tightening has to be carried out on the side of the nut 32, and this requires a certain space to be secured on both sides of each bracket 4, 5 so that the turning tool can be inserted thereinto for a turning operation. In addition, when tightening the nut 32, a retaining tool has to be brought into engagement with the head of the bolt 31 while the nut 32 is turned with the turning tool so that the bolt 31 is restrained from being turned together in order to keep a once adjusted wheel alignment, thus this causing a troublesome operation.

SUMMARY OF THE INVENTION

The present invention was made to solve the problem inherent in the related art, and a main object thereof is to provide a suspension arm mounting structure constructed not only to require less work space for performing wheel alignment adjustment work but also to improve the workability.

With a view to attaining the above object, there is provided a suspension arm mounting structure including, a bolt and a nut fastening a mounting end portion of a suspension arm relative to a vehicle body, a pair of plate cams located at opposite ends of saidbolt, saidpair of plate cams being rotated so as to displace said bolt in a direction orthogonal to an axis thereof, whereby the wheel alignment is adjustable, and a cylindrical collar provided around a shank portion of said bolt. One end of said cylindrical collar provided with one of said pair of plate cams and a first engagement portion for engagement with a turning tool in such a manner as to prohibit a relative rotation therebetween. The other end of said cylindrical collar having a second engagement portion prohibiting a relative rotation between said cylindrical collar and the other of said pair of plate cams.

The one of the pair of plate cams and the engagement portion for engagement with the turning tool are formed integrally with each other relative to the cylindrical collar. In addition to this construction, the plate cam and the engagement portion may be constructed such that they are formed separately and thereafter connected to each other in such a manner as to prohibit a relative rotation therebetween. Moreover, although the other of the pair of plate cams and the nut may be constructed as separate members, they may be constructed integrally with each other in such a manner as to prohibit a relative rotation therebetween. Especially, if they are so constructed, not only can the number of components used be reduced but also the nut is restrained from rotating by restraining the cylindrical collar from rotating by the turning tool engagement portion on the side of the head of the bolt when the bolt is tightened at the head thereof. Thus, the adjustment of the wheel alignment, tightening of the bolt after such an adjustment and prevention of a deviation from an adjusted position can all be performed only on the side of the head of the bolt, and therefore there is provided an advantage that there is no need to insert any tool on the side of the nut, thereby making it possible to reduce further the work space and improve the workability.

DETAILED DESCRIPTION OF THE PREFERRED EMBODIMENTS

Referring to the accompanying drawings, a construction of the present invention will be described in detail below.

Figure 1:
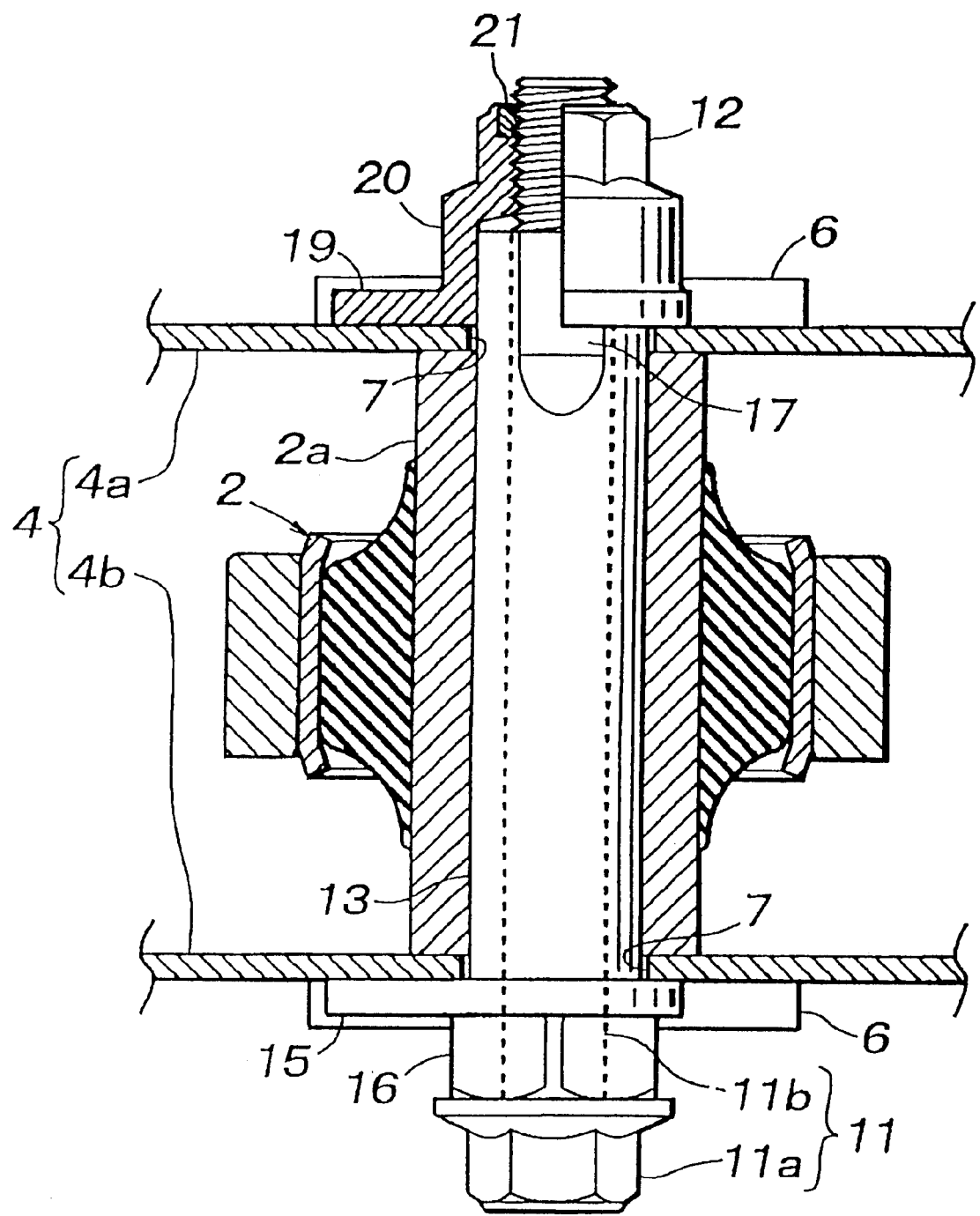
FIG. 1 is a cross-sectional view of a main part of a suspension mounting structure according to the present invention.
Figure 3:
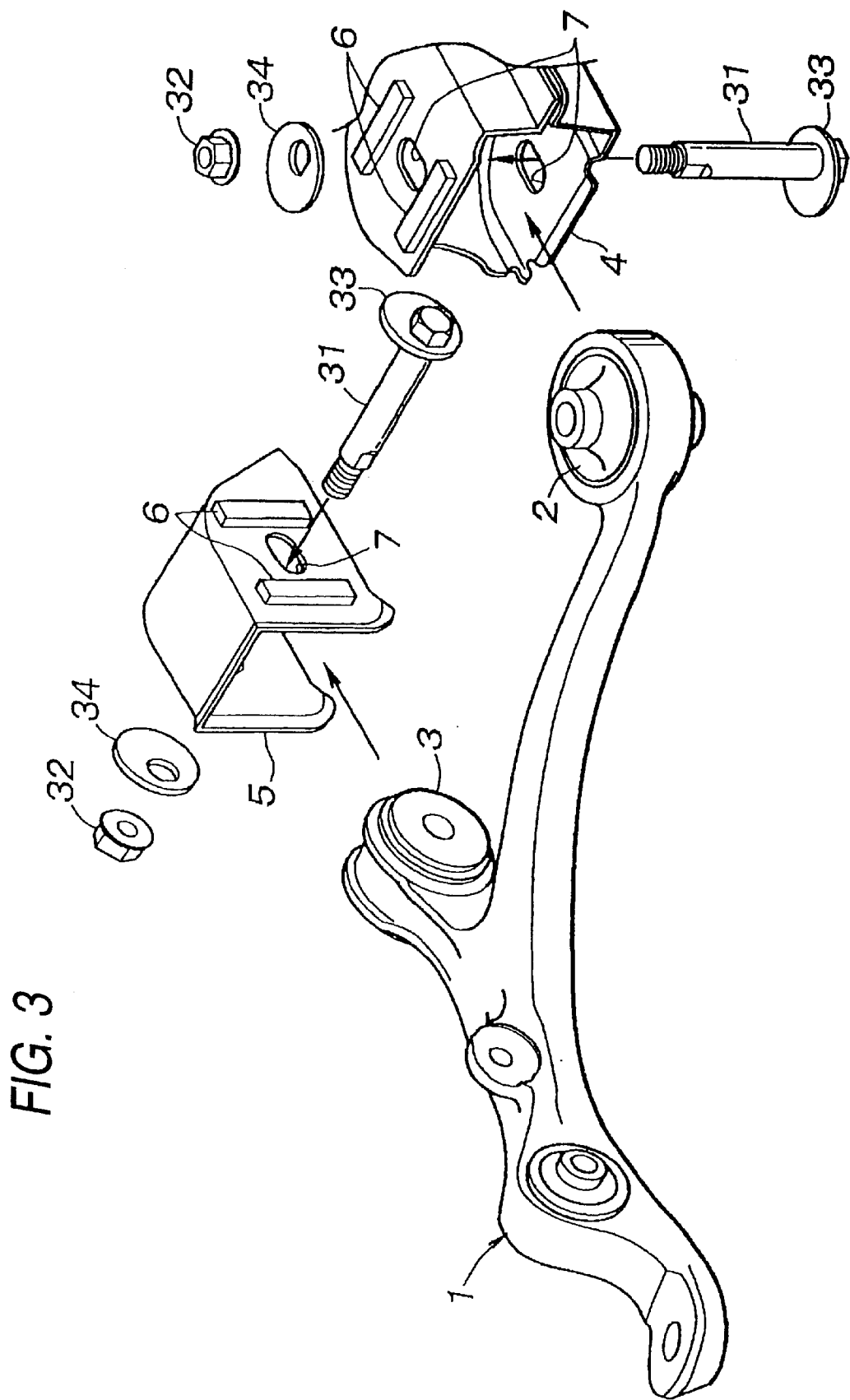
FIG. 3 is a perspective view showing a conventional suspension arm mounting structure.

FIG. 1 shows a main part of a suspension arm mounting structure according to the present invention. In here, a bush 2 of a suspension arm 1 and a bracket 4 on a vehicle body side shown in FIG. 3 are fastened to each other with a bolt 11 and a nut 12. A cylindrical collar 13 is provided in an exterior of a shank portion 11b of the bolt 11, and the bolt 11 and the cylindrical collar 13 are put through elongated holes 7 formed in respective opposed walls 4a, 4b of the bracket 4 and a center hole in an inner cylinder 2a of the bush 2.

A disc-like plate cam 15 provided at an eccentric position relative to an axis of the cylindrical collar 13 and a turning tool engagement portion 16 having a substantially hexagonal cross-section for engagement with a turning tool such as a spanner are formed integrally on one end of the cylindrical collar 13. In addition, a flat surface 17 is formed on an outer circumference of the other end of the cylindrical collar 13.

A plate cam 19 having an external profile identical to that of the plate cam 15 is formed integrally with an cylindrical portion 20 on the nut 12. An inner circumferential profile of the cylindrical portion 20 is formed so as to have a cross-sectional configuration which is complementary to the end of the cylindrical collar 13 where the flat surface 17 is formed, so that the pair of plate cams 15, 19 are connected to each other in such a manner as to prohibit a relative rotation therebetween at a position where apexes of the cam profiles thereof are aligned with each other. In addition, a locking ring 21 of a synthetic resin is fitted in an inner circumferential portion of the nut 12.

In the suspension arm mounting structure constructed as described above, when either of the turning tool engagement portion 16 of the cylindrical collar 13 and the nut 12 is turned with a turning tool which is brought into engagement therewith in a state in which the bolt is not tightened, the pair of plate cams 15 19, whose outer circumferences are each regulated by guides 6, are rotated in an interlocking fashion, whereby the bolt 11 is displaced in a longitudinal direction of the elongated holes 7 in the bracket 4 (In FIG. 1, a direction orthogonal to the plane of the paper), or a direction orthogonal to an axis of the bolt 11, whereby the wheel alignment is adjusted.

Then, in a state that a turning tool is in engagement with either the turning tool engagement portion 16 of the cylindrical collar 13 or the nut 12 so as to restrain the rotation of the cylindrical collar 13 or the nut 12, when the bolt 11 is fastened with a turning tool placed on a head 11a of the bolt 11 for engagement therewith, a pair of walls 4a, 4b of the bracket 4 and the inner cylinder 2a of the bush 2 are secured to each other in a state in which they are held between the pair of plate cams 15, 19. While this is happening, if a turning tool is placed on the turning tool engagement portion 16 for engagement therewith so as not only to adjust the wheel alignment but also to prevent any deviation from an alignment adjusted position while the bolt is being tightened, required work can be performed with no turning tool being inserted on the side of the nut 12.

Figure 2:
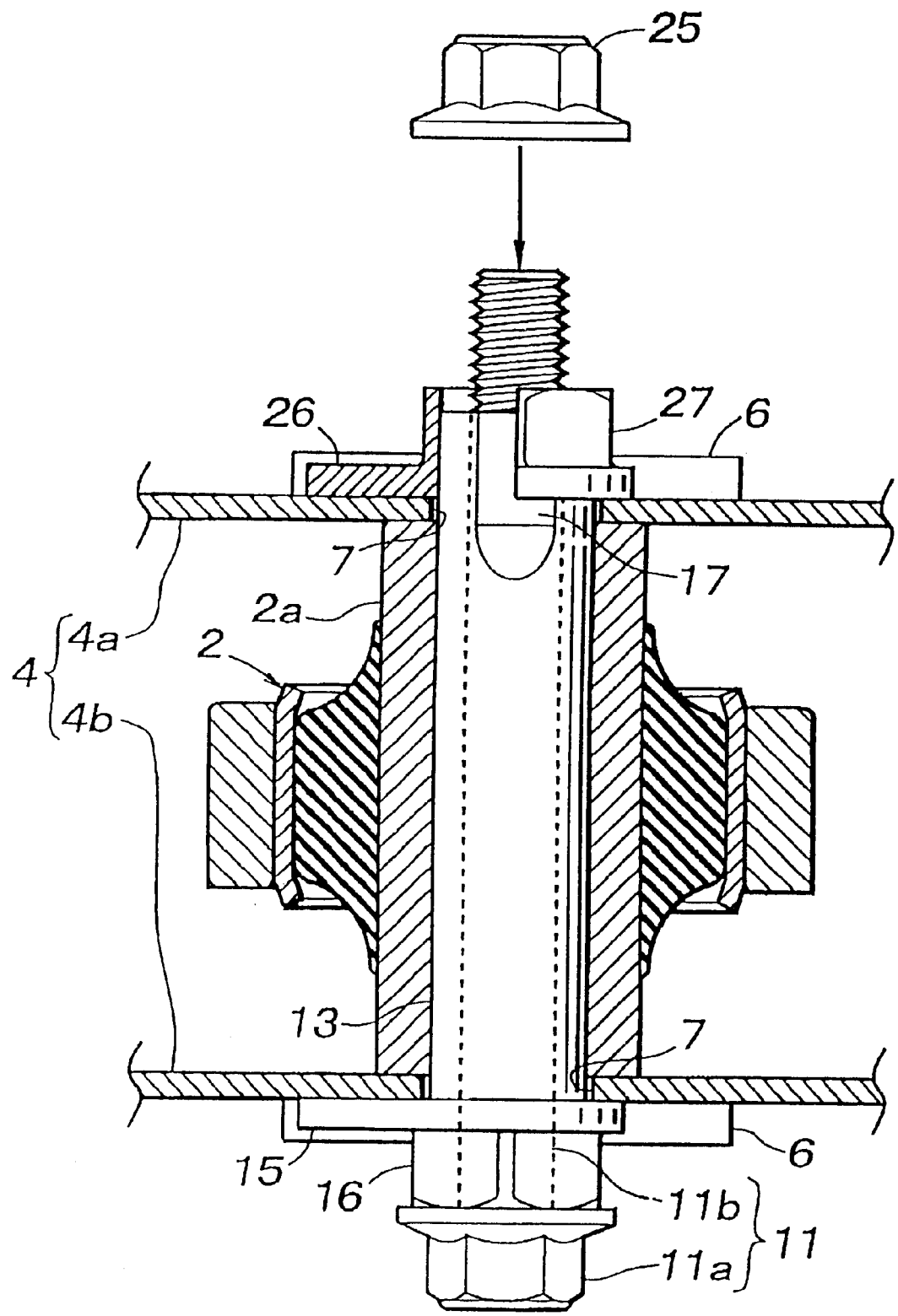
FIG. 2 is a cross-sectional view, similar to that shown in FIG. 1, showing another mode of operation of the suspension arm mounting structure according to the present invention.

In the above embodiment, the plate cam 19 is formed integrally with the nut 12, but as shown in FIG. 2, a nut 25 and a plate cam 26 may be constructed as a separate member. In this case, formed integrally with the plate cam 26 is a turning tool engagement portion 27 similar to the turning tool engagement portion 16. An inner circumference of the turning tool engagement portion 27 is formed so as to have a cross-sectional configuration which is complementary to the end of the cylindrical collar 13 where the flat surface 17 is formed, so that the pair of plate cams 15, 26 are connected to each other in such a manner as to prohibit a relative rotation therebetween.

In addition, in this case, a wheel alignment adjustment may be carried out at either of the turning tool engagement portions 16, 27 of the cylindrical collar 13 and the plate cam 26. Furthermore, although it is possible to tighten the bolt 11 at either of the head 11a of the bolt 11 and the nut 25, the opposed side has to be fixed stationary with a turning tool during the tightening of the bolt. Therefore, in this construction, a space may be secured on a side of either the bolt head 11a or the nut 25 for allowing a turning tool to be operatively turned, while a space may be secured on the remaining side which is required to allow another turning tool to be inserted thereinto for a fixing operation.

In the above embodiments, the axis of the bolt is described as oriented vertically, but it is needless to say that the axis may be oriented horizontally.

Consequently, according to the present invention, since a working space can be reduced which has to be secured for wheel alignment adjustment work in the vicinity of the mounting portion on the vehicle body side, it is possible not only to improve the degree of freedom in designing peripheral components but also to improve workability, thereby making it possible to attain a tremendous advantage.

While only certain embodiments of the invention have been specifically described herein, it will apparent that numerous modifications may be made thereto without departing from the spirit and scope of the invention.

The present disclosure relates to the subject matter contained in Japanese patent application No. Hei. 10-235446 filed on Aug. 21, 1998 which is expressly incorporated herein by reference in its entirety.

What is claimed is:

1. A suspension arm mounting structure, comprising:

a bolt and a nut cooperatively fastening a mounting end portion of a suspension arm relative to a bracket of a vehicle body side;

a pair of plate cams located at opposite ends of said bolt, said pair of plate cams being rotated so as to displace said bolt in a direction orthogonal to an axis thereof, whereby the wheel alignment is adjustable, said pair of plate cams and said bolt being rotatable relative to each other, so that the mounting end portion is fastened relative to said bracket by a head portion of said bolt; and a cylindrical collar provided around a shank portion of said bolt, one end of said cylindrical collar provided with one of said pair of plate cams disposed on a side of said head portion of said bolt and a first engagement portion for engagement with a turning tool in such a manner as to prohibit a relative rotation therebetween, the other end of said cylindrical collar having a second engagement portion prohibiting a relative rotation between said cylindrical collar and the other of said pair of plate cams, whereby the adjustment of the wheel alignment and the fastening of said mounting end portion and said bracket can be performed only at the head portion side of said bolt.

2. A suspension arm mounting structure according to claim 1, wherein said nut is integrally formed with the other of said pair of plate cams.

3. A suspension arm mounting structure according to claim 1, wherein said second engagement portion is constructed by a flat surface provided on an outer circumference of the other end of said cylindrical collar.

4. A suspension arm mounting structure according to claim 1, wherein said first engagement portion is disposed between said the one of said pair of plate cams and a head of said bolt.

* * * * *